United States Patent Office 3,366,588
Patented Jan. 30, 1968

3,366,588
TEXTILE PRINTING PASTES COMPRISING CARBOXYL POLYMER, SALT OF COPOLYMER PARTIAL ESTER AND EPOXIDIZED SOYBEAN OIL
Arthur Booth, Little Falls, N.J., assignor to Interchemical Corporation, New York, N.Y., a corporation of Ohio
No Drawing. Filed June 16, 1965, Ser. No. 464,561
10 Claims. (Cl. 260—23)

This invention relates to novel textile printing compositions and more particularly to pigmented compositions for printing on textiles.

It is old in the art to decorate textiles with printing compositions containing pigments dispersed in aqueous solutions or dispersions of thermoplastic polymers and a crosslinking agent that will react with the polymer to form a binder that binds the pigment to the textile. Most of the prior art crosslinker systems for decorating textiles employ a polyfunctional alkylenimine compound as the crosslinking agent and a water-soluble acrylic resin such as the salt of a polymer or copolymer of acrylic acid as the thermoplastic polymer that will crosslink with the imine compound.

This invention provides compositions for printing colorants on textiles consisting of coloring matter dispersed in a vehicle comprising a thickened aqueous phase, a special elastomeric carboxylate polymer, a reactive dispersant that becomes insoluble when the composition is cured on the textile, a plasticizer, and preferably a lubricant. The thickened aqueous phase is adjusted to a substantially neutral pH with volatile alkaline compounds such as ammonia, morpholine, alkylamines, alkanolamines, etc. A pH of 7 to 9 is most practical but a pH of 6 to 10 can be used.

The color can be any organic or inorganic pigment that is commonly used for textile printing, e.g., phthalocyanine blue, phthalocyanine green, azo reds, benzidine yellow, carbon black, and iron oxide.

As reactive dispersing agents we can use the water soluble salts of the partial esters of maleic anhydride copolymers with monoethylenically unsaturated hydrocarbon monomers, especially benzyl alcohol and butyl Cellosolve partial esters. These dispersing agents, when used with the other essential ingredients of our print pastes, give prints having better crock-fastness and better wash fastness than similar print paste in which conventional dispersing agents such a sodium lauryl sulfate, soaps, and nonionics are used as the dispersing agent. We especially prefer the sodium and ammonium salts of the benzyl esters of ethylene maleic anhydride copolymers. Although we have varied the degree of esterification over wide limits, e.g., 25 to 65%, we especially prefer the half benzyl ester, i.e., the 50% esterified product, of an ethylene maleic anhydride linear copolymer having specific viscosities in the range 0.1 to 0.5 in dimethyl formamide at 25° C. The amount of the reactive dispersing agent is preferably within the ratio of 0.25 to 1.0 part for each part of pigment.

The latices, or aqueous polymer dispersions, that are operable include latices of carboxylated elastomeric, or rubbery copolymers. Elastomeric polymer and copolymer latices are well known anti-crock materials in the art of textile printing with pigments, e.g., see U.S. Patent No. 2,691,005. In general any of these elastomer latices that contain about 1 to about 20% of carboxyl-containing monomer copolymerized with one or more other monomers can be used in our print pastes. For optimum results we especially prefer to use latices of (1) carboxylated acrylic or methacrylic ester elastomeric polymers, (2) carboxylated butadiene-acrylonitrile elastomeric polymers, (3) carboxylated butadiene-acrylic ester elastomer polymers and (4) carboxylated butadiene-styrene elastomeric polymers. In each case the carboxyl-containing monomer may be acrylic acid, methacrylic acid, itaconic acid, etc. Especially preferred polymer latices, or dispersions, are those of the carboxylated elastomeric polymers referred to above containing a reactive dispersant of the type referred to hereinabove. Such latices give the best fastness.

Thickeners for water are well known materials in the textile printing art and in general we can use any of these thickeners that are "reactive" when heated. By reactive we mean that the thickener insolubilizes when the print paste is cured on the textile.

Although conventional plasticizers in general have been used with some success, such as dioctyl phthalate, polyethylene oxides, dibutyl sebacate, Plastolein 9765, Flexol 10–A, Flexol 8N8, and Plastoflex EET, the preferred plasticizer is epoxidized soya oil, e.g., Paraplex G–60. The amount of plasticizer is 3 to 8% of the concentrate color composition or within the limits of about 0.5 to 1.0 part for each part of latex solids.

Textile printing compositions related to the compositions of the present application are disclosed in U.S. application, Ser. No. 206,547, filed June 27, 1962, now U.S. Patent 3,223,663. The compositions of the present invention are improvements over the compositions of said application in that textiles printed therewith have a much softer hand than textiles printed with the compositions of said Ser. No. 206,547. Additionally, in certain instances, as will be disclosed in more detail hereinafter, the printed textile has better fastness properties than textile printed with the compositions of Ser. No. 206,547.

The following examples, in which the parts are by weight unless otherwise stated, are given to further illustrate the invention.

Example 1

A color concentrate containing:

| | Parts |
|---|---|
| Carbon black | 13.80 |
| Reactive dispersing agent (half butyl Cellosolve ester of styrene-maleic anhydride) | 1.38 |
| Reactive latex (40% solids, of copolymer of 78 parts 2-ethylhexyl acrylate, 20 parts acrylonitrile and 2 parts itaconic acid) | 19.00 |
| "Poly-Em" emulsion (40% solids,, polyethylene emulsion) | 5.90 |
| Reactive thickener (Acrysol ASE–60) | 2.20 |
| Reactive dispersing agent, low viscosity grade, 25 to 50 poises (ammonium salt of half benzyl ester of ethylene maleic anhydride copolymer having a specific viscosity of 0.1 in dimethyl formamide) | 5.00 |
| Plasticizer (e.g., Paraplex G–60) | 4.70 |
| Reactive dispersing agent, high viscosity grade, 1500 to 2500 poises (ammonium salt of half benzyl ester of ethylene maleic anhydride copolymer having a specific viscosity of 0.1 in dimethyl formamide) | .73 |
| Ammonium hydroxide, 28% | 3.46 |
| Ethylene glycol (humectant) | 3.90 |
| Water to make 100 parts | | is made by first dispersing the pigment with a 30% aqueous solution of the reactive dispersing agent, low viscosity grade. The slurry is then mixed with the other ingredients with the plasticizer being added last, preferably as an emulsion in an ammoniacal aqueous solution of the high viscosity reactive dispersing agent. The resulting composition can be printed on textiles to give prints having excellent fastness and improved hand over the prior printing pastes. In most instances it will be desirable to cut the concentrate with a clear printing vehicle to produce the desired depth of shade. For this purpose any conventional aqueous or oil-in-water emulsion type clear vehicle may be used. A preferred clear consists of 3.5 parts of a concentrate containing 48.8% Rhoplex E32, 1.89% 4000 cps. grade methyl cellulose, 0.13 ethylene diamine, 2.4% sodium lauryl sulfate, 4.9% of Sipon L–22, and 41.88% water, 78 parts Varsol and 18.5 parts water. To obtain optimum dry crock properties in the final prints it is desirable to include a lubricant as taught in Ser. No. 206,547.

Example 2

In a manner similar to that of Example 1 a concentrate color composition was prepared containing:

| | Parts |
|---|---|
| Red pigment (azo pigment made by coupling diazotized 3-amino-4-methyl benzamide to Naphthol AS–RL) | 9.08 |
| Ammonium oleate, 20% aqueous solution (wetting agent) | 1.36 |
| Reactive latex (as in Example 1) | 18.20 |
| Acrysol ASE–60 (thickener) | 5.40 |
| Reactive disperser, low viscosity grade (as in Example 1) | 2.52 |
| Reactive disperser, high viscosity grade (as in Example 1) | 0.77 |
| Plasticizer, Paraplex G–60 | 4.97 |
| Ammonium hydroxide, 28% | 1.18 |
| Lubricant (DC–36 silicone oil emulsion) | 4.45 |
| Water to make 100 parts. | |

This concentrate is cut to any desired color concentration with clear printing vehicles described in Example 1 to give print pastes which, when printed on textiles and cured at conventional temperatures, give prints having excellent crock fastness and improved hand over the prior art print pastes. Another clear printing vehicle that can be used consists of 2 parts of a concentrate containing 3.4% Lytron 822, 14.3% Resimene 882, 3.7% polyisobutylene (Vistanex LM), 2.5% polyethylene (Vinylite DYLT), 2.3% ammonium nitrate, 8.9% sodium lauryl sulfate, 3.8% soap flakes, 8.3% ammonium hydroxide (28% $NH_3$), 4.8% morpholine, 12% Dupanol L.S., 7.3% 8000 cps. methyl cellulose, 7.5% Carbopol, 4.7% pine oil, and 16.7% butanol, diluted with 50 parts of Varsol and 48 parts of water. The pH is adjusted to 7 to 8 with 28% ammonia.

Example 3

In a manner similar to that of Example 1 a concentrate color composition was prepared containing

| | Parts |
|---|---|
| Benzidine yellow (made by coupling tetraazotized dichlorobenzidine to two moles of 1-aceto-acetyl-amino-4-chloro-2,5-dimethoxybenzene) | 6.40 |
| Ammonium oleate, 20% aqueous solution (wetting agent) | 1.00 |
| Reactive latex (as in Example 1) | 11.40 |
| Acrysol ASE–60 | 1.00 |
| Reactive disperser, low viscosity (as in Example 1) | 2.10 |
| Reactive disperser, high viscosity (as in Example 1) | .80 |
| Paraplex G–60 plasticizer | 4.81 |
| Lubricant (DC–36 silicone oil emulsion) | 4.50 |
| Carbopol polymer | 1.11 |
| Ammonium hydroxide, 28% $NH_2$ | 0.87 |
| Water to make 100 parts. | |

This concentrate is cut to any desired concentration with clear printing vehicles described in the above examples to give print pastes which, when printed on textiles and cured at conventional temperatures, give prints having excellent fastness properties and improved hand over the prior art print pastes.

Example 4

In a manner similar to Example 1 a concentrate color composition was prepared containing

| | Parts |
|---|---|
| Phthalocyanine blue | 13.16 |
| Ammonium oleate, 20% aqueous solution (wetting agent) | 2.17 |
| Reactive disperser, low viscosity, solution (27.8 parts reactive disperser, 8.9 parts 28% $NH_3$ and 63.3 parts water) | 10.97 |
| Plasticizer, Paraplex G–60 | 4.97 |
| Reactive latex (as in Example 1) | 9.80 |
| Acrysol ASE–60 | 5.80 |
| Reactive disperser, high viscosity type (as in Example 1) | .77 |
| Lubricant (DC–36 Silicone oil emulsion) | 4.55 |
| Ammonium hydroxide, 28% $NH_3$ | 1.18 |
| Water to make 100 parts. | |

This concentrate is cut to any desired concentration with clear printing vehicles described in the above examples to print pastes which, when printed on textiles and cured at conventional temperatures, give prints having excellent fastness properties and improved hand over the prior art print pastes.

In general, any of the reactive latices disclosed in copending application, Ser. No. 206,547, can be used in the above examples. However, for maximum fastness properties, and as mentioned hereinabove, reactive latices containing reactive dispersing agent are especially preferred. Latices, as is commonly known, contain substantial amounts of dispersing agents to stabilize them. According to the present invention, is is especially preferred for maximum fastness properties, that the reactive latices used be stabilized with reactive dispersing agents.

The reactive dispersing agents that are useful in the invention are, in general, the same as those described in copending application Ser. No. 206,547. For incorporating the plasticizer into the concentrate color composition a high viscosity grade of the reactive dispersing agent is especially preferred. Advantageously, 50 to 60 parts of the plasticizer is pre-emulsified with 50 to 40 parts of a 15 to 20% ammoniacal solution of the reactive dispersing agent before incorporating it with the other components of the composition. It has been found that such method of incorporation generally gives a more stable composition. In the pre-emulsification of the plasticizer a high viscosity grade of reactive dispersing agent is preferred. While a viscosity on the order of 25 to 50 poises (measured on a 33% ammoniacal aqueous solution at 25° C.) may be used in the invention, a viscosity of about 1500 to 2500 poises is preferred for pre-emulsifying the plasticizer.

Example 5

(A) concentrate color composition containing:

| | Parts |
|---|---|
| Phthalocyanine blue pigment | 16.00 |
| Reactive dispersing agent, low viscosity grade, (ammonium salt of half benzyl ester of ethylene-maleic anhydride copolymer having a specific viscosity of 0.1 in dimethyl formamide) | 4.80 |
| Ammonium hydroxide (28%) | 2.50 |
| Glycerol (humectant) | 1.00 |
| Reactive thickener (Acrysol ASE–60) | 8.58 |
| Paraplex G–60 aqueous emulsion (54% plasticizer and 8.3% high viscosity grade of reactive dispersing agent of Example 1) | 9.2 |
| Reactive latex (40% solid, of copolymer of 78 parts 2-ethylhexyl acrylate, 20 parts acrylonitrile and 2 parts itaconic acid) | 13.50 |
| Water to make 100% | | is made by first slurrying an aqueous presscake of the pigment, containing about 30% pigment, with a 30% aqueous solution of the dispersing agent and enough water to make 100 parts of slurry. The slurry is stirred until uniform and then blended thoroughly with a mixture of the ammonium hydroxide and glycerol before adding the reactive thickener, Paraplex G–60, reactive latex, and water. The resulting composition can be printed on textiles to give prints having excellent fastness properties. However, in most instances it is necessary to cut this concentrate with a clear printing vehicle to produce the desired depth of shade. For this purpose any conventional aqueous or oil-in-water emulsion type clear vehicle may be used. The all aqueous printing vehicle of Example 1 of British Patent No. 781,498 is a suitable extender vehicle. A preferred oil-in-water emulsion type clear would consist of 2.5 parts of a concentrate containing 36% Solvesso 100, 1% Thixin, 25% styrenated alkyd (Cycopol S101–1), 12.4% sodium lauryl sulfate, 0.4 morpholine, 24.6% Monsanto DX840–71 thickener and 25.2% water, diluted with 40 parts Varsol and enough water to make 100 parts. The pH is adjusted to 7 to 8 with 28% ammonia. When extra low crock is desired part of the water in the clear can be replaced with latex, preferably a reactive latex as used in the color if extremely good fastness is desired. Prints made with print pastes of this example have improved hand over the prints made from the print pastes of Example 1 of U.S. Ser. No. 206,547.

*Example 6*

In a manner similar to that of Example 5 a concentrate color composition was prepared containing:

| | Parts |
|---|---|
| Phthalocyanine blue pigment | 16.00 |
| Reactive dispersing agent, low viscosity grade, as in Example 1 | 4.80 |
| Ammonium hydroxide (28%) | 2.50 |
| Glycerol | 1.00 |
| Reactive thickener (Acrysol ASE–60) | 8.58 |
| Reactive latex (40% solid, of copolymer of 52.5 parts butadiene, 42.5 acrylonitrile and 5 parts methacrylic acid) | 13.40 |
| Plasticizer emulsion as in Example 5 | 9.20 |
| Water to make 100%. | |

This concentrate is cut to any desired color concentration with clear printing vehicles described in Example 5 to give print pastes which, when printed on textiles and cured at conventional temperatures, give prints having excellent hand and crock fastness.

In general, any reactive thickener can be used in the invention, i.e., substituted for Acrysol ASE–60 in the above examples. Chemically, these reactive thickeners will comprise linear natural and synthetic polymers or partially cross-linked linear polymers that contain reactive groups, especially carboxyl groups, amide groups, or alkylolated amide groups, such as methylol amide groups. The thickener will be used in the amount necessary to thicken the print paste to printing consistency.

For optimum dry crock properties the print paste should contain a special additive which, for lack of a better term, we can characterize as a lubricant. Suitable dry crock additives, when used in the amount of up to about 5%, include water-insoluble polysiloxane materials, paraffin waxes especially microcrystalline wax, and lubricating oils. The polysiloxane materials are especially effective under varying conditions of humidity, temperature, and other stresses. The use of such lubricants is disclosed in Ser. No. 206,547.

Other conventional additives can be included in the print pastes if desired. For example humectants, preservatives, wetting agents, water-soluble thermosetting resins and water-insoluble resins.

*Example 7*

A concentrate color composition containing:

| | Parts |
|---|---|
| Phthalocyanine blue pigment | 16.0 |
| Reactive dispersing agent, low viscosity grade (as in Example 1) | 4.0 |
| Ammonium hydroxide (28% ammonia) | 2.0 |
| Humectant (glycerol) | 1.0 |
| Reactive thickener (Acrysol ASE–60) | 2.0 |
| Lubricant (DC–22 Silicone resin) | 5.0 |
| Latex of reactive elastomer (butadiene-methyl methacrylate copolymer type) | 16.0 |
| Plasticizer emulsion, as in Example 5 | 9.2 | is made by first slurrying an aqueous presscake of the pigment, containing about 30% pigment, with a 30% aqueous solution of the dispersing agent and enough water to make 100 parts of slurry. The slurry is stirred until uniform and then blended thoroughly with a mixture of the ammonium hydroxide and glycerol before adding the reactive thickener, lubricant, latex, and water in the order given, mixing thoroughly after each addition. The resulting composition can be printed on textiles to give prints having excellent fastness properties. However, in most instances it is necessary to cut this concentrate with a clear printing vehicle to produce the desired depth of shade. For this purpose any conventional aqueous or oil-in-water emulsion type clear vehicle may be used.

*Example 8*

In a manner similar to that of Example 7 a concentrate color composition was prepared containing:

| | Parts |
|---|---|
| Phthalocyanine green pigment | 16.60 |
| Reactive dispersing agent, low viscosity grade, as in Example 1 | 4.15 |
| Tamol N (40% aqueous solution of the condensate of naphthalene sulfonic acid and formaldehyde) | 1.65 |
| Ammonia (28%) | 3.00 |
| Thickener, as in Example 5 | 4.00 |
| Lubricant, as in Example 7 | 5.00 |
| Latex of reactive elastomer, as in Example 7 | 15.00 |
| Plasticizer emulsion, as in Example 5 | 9.2 |
| Water to make 100 parts. | |

This example illustrates the use of a small amount of conventional dispersing agent, Tamol N, in addition to the reactive dispersing agent. This concentrate can be cut to any desired color concentration with the clear printing vehicles described in the previous examples to give print pastes which, when printed on textiles and cured at conventional temperatures, give prints having excellent hand and crock fastness.

*Example 9*

A color concentrate was similarly prepared containing:

| | Parts |
|---|---|
| Red azo pigment (e.g., made by coupling the 2,5-dimethoxy-5-chloro anilide of $\beta$-oxynaphthoic acid with diazotized 2-methoxy-5-sulfondiethylaniline) | 11.50 |
| Reactive dispersing agent, low viscosity grade, as in Example 1 | 9.30 |
| Tamol N (same as in Example 8) | 1.15 |
| Ammonia (28%) | 1.80 |
| Thickener (same as in Example 1) | 3.70 |
| Lubricant (same as in Example 7) | 5.00 |
| Latex of reactive elastomer (same as in Example 7) | 11.15 |
| Plasticizer emulsion, as in Example 5 | 9.2 |
| Water to make 100 parts. | |

This and the subsequent examples of color concentrate have properties similar to the foregoing examples and can be treated in the same way.

Example 10

This and the subsequent examples of color concentrates were prepared in a manner similar to those of the foregoing examples. The components were:

| | Parts |
|---|---|
| Violet Azo pigment made by coupling the p-phenetidide of β-oxynaphthoic acid with diazotized 2-methoxy 4-benzoylamino | 6.45 |
| Reactive dispersing agent (sodium salt of the half benzyl ester of ethylene-maleic anhydride used in Example 1) | 3.85 |
| Sodium oleate, wetting agent | 1.35 |
| Ammonia (28%) | 2.00 |
| Thickener (as in Example 1) | 5.00 |
| Lubricant (as in Example 5) | 5.00 |
| Latex of reactive elastomer (as in Example 7) | 6.70 |
| Plasticizer emulsion (as in Example 5) | 9.20 |
| Water to make 100%. | |

Example 11

The constituents were:

| | Parts |
|---|---|
| Red azo pigment (made by coupling Naphthol AS–KB with diazotized amino anisic acid anilide) | 12.60 |
| Reactive dispersing agent, low viscosity grade, as in Example 1 | 10.50 |
| Tamol N, as in Example 8 | 1.26 |
| Ammonia (28%) | 1.90 |
| Thickener as in Example 1 | 3.80 |
| Humectant (ethylene glycol) | 1.00 |
| Lubricant, as in Example 5 | 4.80 |
| Latex of reactive elastomer, as in Example 7 | 13.40 |
| Plasticizer emulsion, as in Example 7 | 9.20 |
| Water to make 100%. | |

Example 12

The constituents were:

| | Parts |
|---|---|
| Benzidine yellow | 12.55 |
| Reactive dispersing agent as in Example 10 | 7.18 |
| Soap flakes | 2.51 |
| Ammonia (28%) | 1.00 |
| Thickener, as in Example 1 | 2.30 |
| Lubricant, as in Example 7 | 5.00 |
| Latex of reactive elastomer, as in Example 7 | 12.55 |
| Plasticizer emulsion, as in Example 7 | 9.20 |
| Water to make 100%. | |

Example 13

The constituents were:

| | Parts |
|---|---|
| Copper chelate of an azo brown (made by coupling of β-oxy-naphthoic acid with diazotized p-nitro aniline) | 15.00 |
| Reactive dispersing agent, as in Example 10 | 15.00 |
| Thickener, as in Example 1 | 2.00 |
| Lubricant, as in Example 7 | 4.00 |
| Latex of reactive elastomer, 41% solids, carboxylated styrene-butadiene copolymer | 15.00 |
| Plasticizer emulsion, as in Example 5 | 9.2 |
| Water to make 100 parts. | |

Example 14

The constituents were:

| | Parts |
|---|---|
| Mapico Lemon yellow (iron oxide yellow) | 39.00 |
| Reactive dispersing agent, low viscosity grade, as in Example 1 | 10.80 |
| Ammonia (28%) | 0.54 |
| Thickener, as in Example 1 | 2.16 |
| Latex of reactive elastomer, carboxylated styrene-butadiene copolymer | 19.40 |
| Plasticizer emulsion, as in Example 5 | 9.20 |
| Water to make 100%. | |

Example 15

The constituents were:

| | Parts |
|---|---|
| Red azo pigment, as in Example 9 | 12.60 |
| Ammonia (28%) | 1.90 |
| Thickener, as in Example 1 | 3.80 |
| Microcrystalline wax emulsion (16%) | 10.00 |
| Latex of reactive elastomer, 41% solids carboxylated styrene-butadiene copolymer | 15.00 |
| Plasticizer emulsion, as in Example 5 | 9.20 |
| Water to make 100%. | |

Example 16

The constituents were:

| | Parts |
|---|---|
| Carbon black pigment | 16.80 |
| Reactive dispersing agent, low viscosity grade, as in Example 1 | 4.20 |
| Ammonia (28%) | 1.00 |
| Thickener, as in Example 1 | 2.00 |
| "Poly-em" emulsion, 40% solids (polyethylene emulsion) | 7.00 |
| Latex of reactive elastomer, 41% solids, carboxylated styrene-butadiene copolymer | 30.00 |
| Plasticizer emulsion, as in Example 5 | 9.20 |
| Water to make 100%. | |

Example 17

The constituents were:

| | Parts |
|---|---|
| Phthalocyanine blue pigment | 16.65 |
| Reactive dispersing agent (half butyl Cellosolve ester of styrene-maleic anhydride copolymer) | 4.17 |
| Ammonia (28%) | 3.00 |
| Acrysol ASE–60 | 4.00 |
| Latex of reactive elastomer (as in Example 7) | 15.00 |
| Plasticizer emulsion, as in Example 5 | 9.20 |
| Water to make 100%. | |

In the above examples the un-identified tradename materials have the following meanings:

"Varsol" is a petroleum hydrocarbon solvent having a boiling range of 304–394° F. and a kauri-butanol value of 33–45.

Solvesso 100 is a petroleum hydrocarbon having a boiling range of 320–360° F. and a kauri-butanol value of about 93.

Cycopol S–101–1 is an alkyd 25% styrenated and is used as a 50% solution in petroleum spirits.

Monsanto DX–840–71 is a partially crosslinked ethylene-maleic anhydride copolymer having a viscosity of 40,000 cps. in a 1% dimethyl formamide solution when measured in a Brookfield Viscometer at 5 r.p.m. with a No. 6 spindle and at 25° C.

Acrysol ASE–60 is an aqueous emulsion of low viscosity capable of producing great thickening action when made alkaline. The copolymer dispersed in the emulsion is a carboxylic acid-containing crosslinked acrylic ester. The emulsion contains 28% solids, the colloidal charge is anionic, the pH as supplied is 3.5. The viscosity as supplied is 4.0 cps. but the solution viscosity of 5% sodium salt is 25,000 cps., the 1% sodium salt being 3,000 cps. Viscosities are Brookfield values, 12 r.p.m. at 25° C. In stoichiometric calculations the solids have an effective equivalent weight of 218.

Carbopol in the ammonium salt of a copolymer of 100 parts acrylic acid and 1 to 2 parts of allyl sucrose.

Duponol L.S. is sodium oleyl sulfate.

Sipon L–22 is a 30% aqueous solution of ammonium lauryl sulfate.

Vinylite DYLT is polyethylene having molecular weight of 18,000.

Lytron 822 is a styrene-maleic anhydride copolymer.

Resimene 882 is a 66% solids solution of butylated melamine formaldehyde resin in xylol.

Rhoplex E32 is a latex of a reactive polymeric lower alkyl acrylate.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of this invention.

What is claimed is:

1. A reactive textile printing composition consisting of pigment dispersed in a vehicle comprising (a) a thickened aqueous phase, the thickener of which contains reactive groups and insolubilizes when the printing composition is cured by heat, (b) a carboxylated elastomeric polymer including from 1 to 20% of an acid selected from the group consisting of acrylic, methacrylic and itaconic acid, (c) a reactive dispersing agent consisting of water-soluble salts of partial esters of the copolymer of the group consisting of copolymers of maleic anhydride with ethylene, and copolymers of maleic anhydride with styrene, the esterifying substances being selected from the group consisting of benzyl alcohol and ethylene glycol monobutyl ether, the degree of partial esterification being from 25 to 65%, and the amount of said dispersing agent being from 0.25 to 1 part for each part of pigment, (d) 0 to 5% of a lubricant selected from the group consisting of lubricating oil, paraffin wax, and mixtures of polydimethylsiloxanes with polymethylhydrogen-siloxanes, and (e) 0.5 to 1.0 part of epoxidized soya oil for each part of latex solids.

2. A reactive textile printnig composition according to claim 1 wherein (a) the thickened aqueous phase has been brought to a pH of 7–9 with a volatile alkaline substance.

3. A reactive textile printing composition consisting of pigment dispersed in a vehicle comprising (a) a thickened aqueous phase, the thickener of which contains reactive groups and insolubilize when the printing composition is cured by heat, (b) a carboxylated elastomeric polymer including from 1 to 20% of an acid selected from the group consisting of acrylic, methacrylic and itaconic acid, (c) a reactive dispersing agent consisting of water-soluble salts of partial esters of the copolymer of maleic anhydride with ethylene, the esterifying substances being selected from the group consisting of benzyl alcohol and ethylene glycol monobutyl ether, the degree of esterification being from 25 to 65%, and the amount of said dispersing agent being from 0.25 to 1 part for each part of pigment, (d) 0 to 5% of a lubricant selected from the group consisting of lubricating oil, paraffin wax, and mixtures of polydimethyl-siloxanes with polymethylhydrogen-siloxanes, and (e) 0.5 to 1.0 part of epoxidized soya oil for each part of latex solids.

4. A reactive textile printing composition according to claim 3 wherein (a) the thickened aqueous phase has been brought to a pH of 7–9 with a volatile alkaline substance.

5. A reactive textile printing composition consisting of pigment dispersed in a vehicle comprising (a) a thickened aqueous phase, the thickener of which contains reactive groups and insolubilizes when the printing composition is cured by heat, (b) a carboxylated elastomeric polymer including from 1 to 20% of an acid selected from the group consisting of acrylic, methacrylic and itaconic acid, (c) a reactive dispersing agent consisting of water-soluble salts of the half benzyl ester of the copolymer of maleic anhydride with ethylene, the amount of said dispersing agent being from 0.25 to 1 part for each part of pigment, (d) 0 to 5% of a lubricant selected from the group consisting of lubricating oil, paraffin wax, and mixtures of polydimethylsiloxanes with polymethylhydrogensiloxanes, and (e) 0.5 to 1.0 part of epoxidized soya oil for each part of latex solids.

6. A reactive textile printing composition consisting of pigment dispersed in a vehicle comprising (a) a thickened aqueous phase, the thickener of which contains reactive groups and insolubilizes when the printing composition is cured by heat, (b) a carboxylated elastomeric copolymer of butadiene and methyl methacrylate made by copolymerizing butadiene with methyl methacrylate and 1 to 20% of a copolymerizable carboxylic acid of the group consisting of acrylic, methacrylic and itaconic acids, (c) a reactive dispersing agent consisting of the water soluble salts of the half benzyl ester of the copolymer of maleic anhydride with ethylene, and the amount of acid dispersing agent being from 0.25 to 1 part for each part of pigment, (d) 0 to 5% of a lubricant selected from the group consisting of lubricating oil, paraffin wax and mixtures of polydimethylsiloxanes with polymethylhydrogensiloxanes, and (e) 0.5 to 1.0 part of epoxidized soya oil for each part of latex solids.

7. A reactive textile printing composition consisting of pigment dispersed in a vehicle comprising (a) a thickened aqueous phase, the thickener of which contains reactive groups and insolubilizes when the printing composition is cured by heat, (b) a latex of a coplymer of 52.5 parts butadiene, 42.5 parts acrylonitrile and 5 parts methacrylic acid, (c) a reactive dispensing agent consisting of the water soluble salts of the half benzyl ester of the copolymer of maleic anhydride with ethylene, the amount of said dispensing agent being from 0.25 ot 1 part for each part of pigment, and (d) 0.5 to 1.0 part of epoxidized soya oil for each part of latex solids.

8. A reactive textile printing composition as is claimed in claim 7 and contains microcrystalline wax in an amount not exceeding 5% by weight.

9. A reactive textile printing composition consisting of pigment dispersed in a vehicle comprising (a) a reactive thickener that insolubilizes when the printing paste is cured by heat, (b) a latex of a copolymer of 78 parts of 2-ethyl hexyl acrylate, 20 parts acrylonitrile and 2 parts itaconic acid, and (c) a reactive dispersing agent consisting of water-soluble salt of the half benzyl ester of maleic anhydride with ethylene, the amount of said dispersing agent being from 0.25 to 1 part for each part of pigment, and (d) 0.5 to 1.0 part of epoxidized soya oil for each part of latex solids.

10. A reactive textile printing composition as claimed in claim 9 and containing microcrystalline wax in an amount not exceeding 5% by weight.

References Cited

UNITED STATES PATENTS

| | | | |
|---|---|---|---|
| 3,079,356 | 2/1963 | Oda et al. | 260—29.6 |
| 3,223,663 | 12/1965 | Altobelli et al. | 260—28.5 |
| 3,238,170 | 3/1966 | Wolff et al. | 260—29.6 |
| 3,256,233 | 6/1966 | Hahn et al. | 260—29.6 |
| 3,262,898 | 7/1966 | Williams | 260—29.6 |

DONALD E. CZAJA, *Primary Examiner.*

R. A. WHITE, *Assistant Examiner.*